United States Patent
Imai

(10) Patent No.: US 8,899,754 B2
(45) Date of Patent: Dec. 2, 2014

(54) PROJECTION TYPE IMAGE DISPLAY APPARATUS AND CONTROL METHOD THEREFOR

(75) Inventor: Hiroshi Imai, Minato-ku (JP)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 13/263,659

(22) PCT Filed: Mar. 9, 2010

(86) PCT No.: PCT/JP2010/053895
§ 371 (c)(1),
(2), (4) Date: Oct. 7, 2011

(87) PCT Pub. No.: WO2010/116838
PCT Pub. Date: Oct. 14, 2010

(65) Prior Publication Data
US 2012/0019783 A1    Jan. 26, 2012

(30) Foreign Application Priority Data
Apr. 9, 2009  (JP) .................................. 2009-094775

(51) Int. Cl.
| G03B 21/14 | (2006.01) |
| G03B 21/00 | (2006.01) |
| G02B 27/10 | (2006.01) |
| G02B 27/14 | (2006.01) |
| G02B 27/28 | (2006.01) |
| G02F 1/01  | (2006.01) |

(52) U.S. Cl.
CPC .............. *G03B 21/00* (2013.01); *G02B 27/104* (2013.01); *G02B 27/145* (2013.01); *G02B 27/283* (2013.01); *G02F 1/0136* (2013.01)
USPC .................. 353/20; 353/30; 353/31

(58) Field of Classification Search
USPC ................. 353/20, 30, 31, 33, 37–38, 85, 94, 353/98–99, 121; 362/19, 232, 236, 247, 362/265, 551; 349/5, 7–9; 348/58, 348/743–747, E13.001
See application file for complete search history.

(56) References Cited

U.S. PATENT DOCUMENTS 6,648,475 B1 * 11/2003 Roddy et al. ..................... 353/31
7,370,973 B2 * 5/2008 Sakaguchi et al. .............. 353/20
(Continued)

FOREIGN PATENT DOCUMENTS

| JP | 3-109591 A    | 5/1991 |
| JP | 2002-062582 A | 2/2002 |

(Continued)

OTHER PUBLICATIONS

Office Action issued Jul. 16, 2013 by Japanese Foreign Patent Office in counterpart Japanese Application No. 2011-508290.
Office Action dated Oct. 1, 2013, issued by the Japanese Patent Office in counterpart Japanese Application No. 2011-508290.

*Primary Examiner* — Sultan Chowdhury
(74) *Attorney, Agent, or Firm* — Sughrue Mion, PLLC

(57) ABSTRACT

There is provided a projection-type image display apparatus which is capable of solving the problem in which the reduction ratio of speckles is small. Light source emits a light beam that is modulated according to a video signal. Projector projects the light beam emitted from light source to display an image. Changer changes a polarized state of the light beam emitted from the light source to projector or changes a polarized state of the light beam projected by the projector. Controller repeatedly selects a plurality of predetermined particular polarized states according to a predetermined sequence. Controller switches the polarized state changed by the changer to the selected particular polarized states.

14 Claims, 9 Drawing Sheets

(56) References Cited

U.S. PATENT DOCUMENTS

| | | | |
|---|---|---|---|
| 8,189,038 B2 * | 5/2012 | DeCusatis et al. | 348/58 |
| 8,289,380 B2 * | 10/2012 | Kim et al. | 348/58 |
| 8,382,288 B2 * | 2/2013 | Narimatsu et al. | 353/31 |
| 2004/0257537 A1 * | 12/2004 | Bierhuizen et al. | 353/31 |
| 2006/0023164 A1 | 2/2006 | Sakaguchi et al. | |
| 2006/0023165 A1 | 2/2006 | Ishihara et al. | |
| 2006/0055834 A1 * | 3/2006 | Tanitsu et al. | 349/5 |
| 2006/0065820 A1 * | 3/2006 | Nagai | 250/225 |
| 2006/0238720 A1 * | 10/2006 | Lee et al. | 353/38 |
| 2007/0153235 A1 | 7/2007 | Morikawa et al. | |
| 2009/0190098 A1 * | 7/2009 | DeJong et al. | 353/20 |
| 2009/0310042 A1 * | 12/2009 | Vidal et al. | 349/8 |
| 2010/0225751 A1 * | 9/2010 | Nemeth | 348/58 |

FOREIGN PATENT DOCUMENTS

| | | |
|---|---|---|
| JP | 2005-115276 A | 4/2005 |
| JP | 2006-047421 A | 2/2006 |
| JP | 2006-047422 A | 2/2006 |
| JP | 2006-091471 A | 4/2006 |
| JP | 2006-284749 A | 10/2006 |
| JP | 2008-165058 A | 7/2008 |
| JP | 2010-026483 A | 2/2010 |
| JP | 2010-145769 A | 7/2010 |
| JP | 2010-156841 A | 7/2010 |
| WO | 2005/062114 A1 | 7/2005 |

* cited by examiner

PROJECTION TYPE IMAGE DISPLAY APPARATUS AND CONTROL METHOD THEREFOR

CROSS REFERENCE TO RELATED APPLICATIONS

This application is a National Stage of International Application No. PCT/JP2010/053895, filed on Mar. 9, 2010, which claims priority from Japanese Patent Application No. 2009-094775, filed Apr. 9, 2009, the contents of all of which are incorporated herein by reference in their entirety.

TECHNICAL FIELD

The present invention relates to a projection-type image display apparatus and a control method therefor, and more particularly to a projection-type image display apparatus for displaying an image on a screen by scanning the screen with a laser beam, and a control method for such a projection-type image display apparatus.

BACKGROUND ART

There is known a projection-type image display apparatus wherein incoherent light emitted from a light source such as a halogen lamp or a high-pressure mercury lamp is projected onto a planar image display device such a liquid crystal light bulb, and light emitted from the image display device is enlarged and projected onto a screen by a projection lens for thereby displaying an image.

Since the projection-type image display apparatus uses incoherent light, it is problematic in that it consumes much electric power and the displayed image has a low luminance level. Furthermore, since the wavelength range of the incoherent light emitted from the light source is wide, it has been difficult to increase a chromaticity range. The projection-type image display apparatus cannot easily be reduced in size because the planar image display device is used as an image display device. In addition, inasmuch as the displayed image is out of focus unless the displayed image is projected within the depth of focus of the projection lens, the user is required to adjust the focus of the displayed image depending on the position of the screen, and hence the projection-type image display apparatus is not user-friendly.

A projection-type image display apparatus which employs a laser beam source for emitting a laser beam have been proposed or developed as a technology for solving the above problems. Such a projection-type image display apparatus includes a scanning-type image display apparatus for displaying an image by projecting a laser beam emitted from a light source onto a screen while the screen is being scanned by the laser beam.

The projection-type image display apparatus with the laser beam source is disadvantageous in that the quality of displayed images is low because of visually unpleasant noise called speckles on the screen. Speckles refer to spot-like noise produced by the interference of light scattered from spots on the screen when a coherent beam such as a laser beam is projected onto the screen.

Technologies which are capable of reducing such speckles include a two-dimensional image display apparatus disclosed in Patent document 1 and a light emission apparatus disclosed in Patent document 2.

According to the above technologies, the polarized state (the direction of polarization and the type of polarization) of a laser beam emitted from a light source is randomly changed, and the laser beam in the changed polarized state is projected onto a screen. Since the pattern of speckles varies with time, it is possible to average the speckles over time, resulting in reduced speckles.

PRIOR TECHNICAL DOCUMENTS

Patent Documents

Patent document 1: PC(WO)2005/062114
Patent document 2: P2006-091471A

SUMMARY OF THE INVENTION

Problems to be Solved by the Invention

The technologies disclosed in Patent documents 1, 2 are problematic in that the reduction ratio of speckles is small. The cause of this problem will be described below.

FIG. 1 is a diagram illustrative of why speckles are produced.

As shown in FIG. 1, laser beam 101 emitted from a light source is reflected by screen 102 and applied as reflected beam 103 to the eyes of the user. If laser beam 101 is elliptically polarized, then mutually perpendicular polarized components Ex, Ey of an electric field vector of laser beam 101 are expressed by the following equations 1:

$$Ex = Ex(x,y)$$

$$Ey = Ey(x,y) \cdot \exp(j\delta(x,y)) \qquad \text{[Equations 1]}$$

where j represents an imaginary unit and $\delta$ the phase difference between polarized components Ex, Ey.

Complex amplitude reflectance rx of polarized component Ex on screen 102 and complex amplitude reflectance ry of polarized component Ey on screen 102 are expressed by the following equations 2:

$$rx = Rx(x,y) \cdot \exp(j\phi x(x,y))$$

$$ry = Ry(x,y) \cdot \exp(j\phi y(x,y)) \qquad \text{[Equations 2]}$$

where Rx(x,y) and Ry(x,y) represent amplitude reflectances on screen 102, and $\phi x(x,y)$, $\phi y(x,y)$ phase jumps on screen 102.

Amplitudes Ax, Ay of the mutually perpendicular polarized components of an electric field vector of reflected beam 103 are expressed by the following equations 3:

$$Ax = Rx(x,y) \cdot Ex(x,y)$$

$$Ay = Ry(x,y) \cdot Ey(x,y) \qquad \text{[Equations 3]}$$

If it is assumed that screen 102 has a totally diffusive surface, then when the laser beam is reflected by the screen, the polarized state of the laser beam is eliminated, and reflected beam 103 becomes a beam having an amplitude which is represented by the sum of amplitudes Ax, Ay. Such a beam has a beam intensity I(x,y) expressed by the following equation 4:

$$I(x,y) = Ax^2 + Ay^2 + 2Ax \cdot Ay \cdot \cos(\phi - \delta), \ \phi = \phi x - \phi y \qquad \text{[Equation 4]}$$

The second term $2Ax \cdot Ay \cdot \cos(\phi - \delta)$ on the right side of the equation 4 is an interference term that occurs due to the interference of reflected light 103. A beam intensity relative to the interference term appears as speckles.

According to the technologies disclosed in Patent document 1 and Patent document 2, the polarized state of the laser beam is randomly changed to change phase difference $\delta$ randomly. Therefore, the interference term is averaged over time to average the speckles over time. However, since the interference term itself is not suppressed, the reduction ratio of speckles is small.

It is an object of the present invention to provide a projection-type image display apparatus and a control method therefor which are capable of solving the above problem that the reduction ratio of speckles is small.

Means for Solving the Problems

A projection-type image display apparatus according to the present invention comprises a light source for emitting a light beam that is modulated according to a video signal, projecting means for projecting the light beam emitted from said light source to display an image, changing means for changing a polarized state of the light beam emitted from said light source to said projecting means or changing a polarized state of the light beam projected by said projecting means, and control means for repeatedly selecting a plurality of predetermined particular polarized states according to a predetermined sequence, and switching the polarized state changed by said changing means to the selected particular polarized states.

According to the present invention, there is also provided a method of controlling a projection-type image display apparatus including a light source for emitting a light beam is modulated according to a video signal, projecting means for projecting the light beam emitted from said light source to display an image, and changing means for changing a polarized state of the light beam emitted from said light source to said projecting means or changing a polarized state of the light beam projected by said projecting means, said method comprising the selecting step of repeatedly selecting a plurality of predetermined particular polarized states according to a predetermined sequence, and the switching step of switching the polarized state changed by said changing means to the selected particular polarized states.

Advantages of the Invention

According to the present invention, it is possible to increase the reduction ratio of speckles.

MODE FOR CARRYING OUT THE INVENTION

Figure 1:
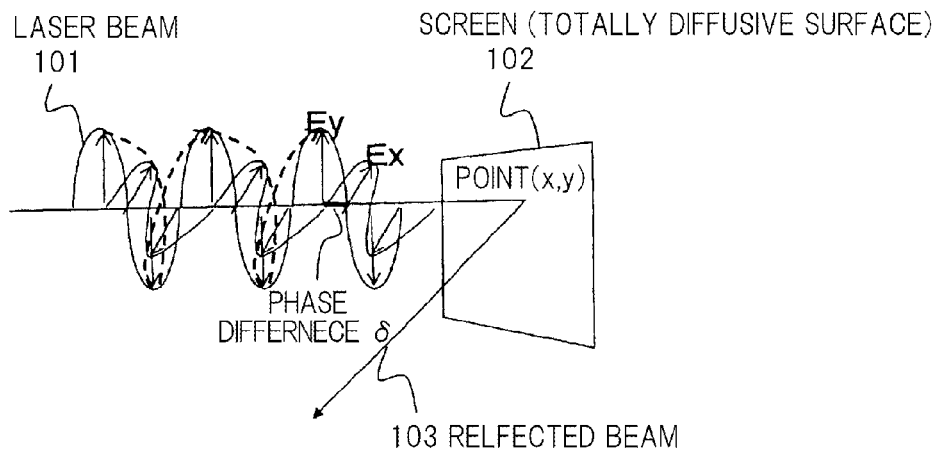
FIG. 1 is a diagram illustrative of why speckles are produced.

Exemplary embodiments of the present invention will be described below with reference to the drawings. In the description that follows, components having identical functions may be denoted by identical reference characters and may not be described in detail.

Figure 2:
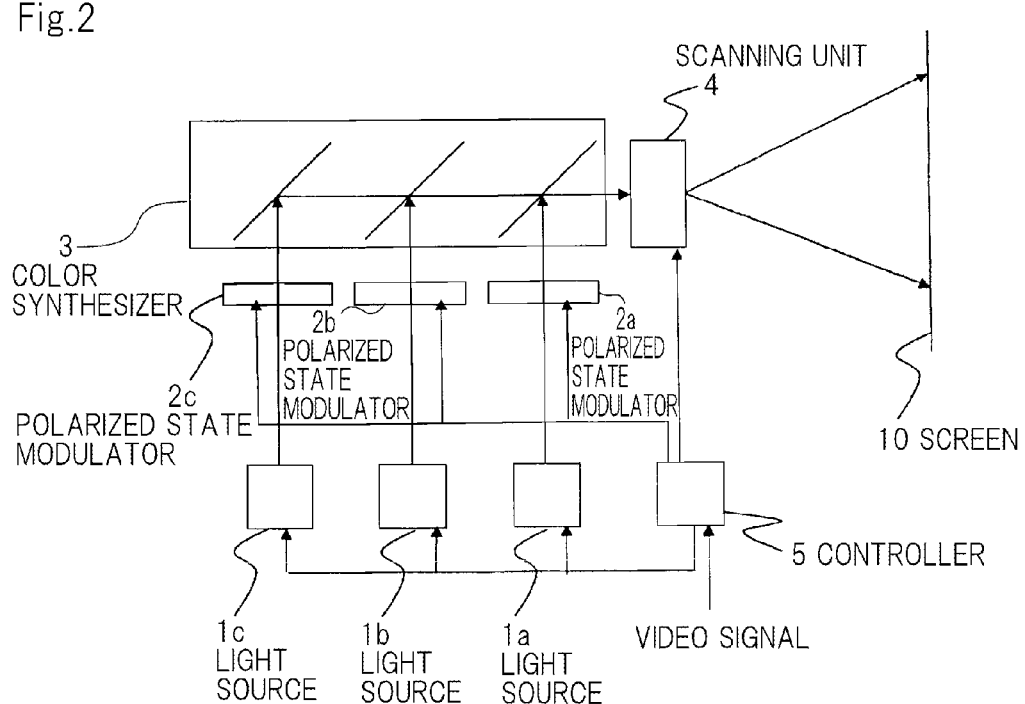
FIG. 2 is a block diagram showing the arrangement of a projection-type image display apparatus according to a first exemplary embodiment of the present invention.

FIG. 2 is a block diagram showing the arrangement of a projection-type image display apparatus according to a first exemplary embodiment of the present invention. As shown in FIG. 2, the projection-type image display apparatus includes light sources 1a through 1c, polarized state modulators 2a through 2c, color synthesizer 3, scanning unit 4, and controller 5.

Light sources 1a through 1c emit respective laser beams having wavelengths which are different from each other.

It is assumed that light source 1a emits a blue laser beam (wavelength: 440 nm), light source 1b emits a red laser beam (wavelength: 640 nm), and light source 1c emits a green laser beam (wavelength: 532 nm). The laser beams emitted respectively from light sources 1a through 1c have a beam diameter of 700 µm.

It is also assumed that light sources 1a, 1b comprise semiconductor lasers. Specifically, light source 1a comprises a blue semiconductor laser of 440 nm, and light source 1b comprises a red semiconductor laser of 640 nm. Light source 1c includes an infrared semiconductor laser of 1064 nm and an optical device (SHG (Second Harmonic Generation) or the like) for emitting a second harmonic (532 nm) of an infrared laser beam from the infrared semiconductor laser as a green laser beam.

Light sources 1a through 1c are not limited to the above examples, but may be modified. For example, light source 1c may comprise a fiber laser.

Polarized state modulators 2a through 2c are an example of changing means. Each of polarized state modulators 2a through 2c is associated with one of light sources 1a through 1c in one-to-one correspondence, and changes the polarized state of a laser beam which is emitted from the associated light source to scanning unit 4. It is assumed that polarized state modulator 2a is associated with light source 1a, polarized state modulator 2b with light source 1b, and polarized state modulator 2c with light source 1c.

Color synthesizer 3 synthesizes the laser beams whose polarized states have been changed by polarized state modulators 2a through 2c into a synthesized beam. More specifically, color synthesizer 3 synthesizes the laser beams along one optical axis. Color synthesizer 3 may comprise, for example, a synthetic optical system such as a dichroic mirror, a dichroic prism, or a fiber coupler. In the present invention, it is assumed that color synthesizer 3 comprises a dichroic mirror.

Scanning unit 4 is an example of projecting means. Scanning unit 4 two-dimensionally deflects the synthesized beam generated by color synthesizer 3 to project the synthesized beam onto screen 10 for thereby displaying an image on screen 10. Screen 10 has a surface which eliminates the polarized state of light when screen 10 reflects the light.

Specifically, scanning unit 4 includes a horizontal scanner for horizontally deflecting the synthesized beam and a vertical scanner for vertically deflecting the synthesized beam which has been deflected by the horizontal scanner. For example, scanning unit 4 includes a resonant micromechanical scanning device as the horizontal scanner and a galvanometer mirror as the vertical scanner. Scanning unit 4 deflects the synthesized beam two-dimensionally when the resonant micromechanical scanning device deflects the synthesized beam horizontally back and forth and the galvanometer mirror deflects the synthesized beam which has been horizontally deflected, vertically in one way.

In the present exemplary embodiment, it is assumed that scanning unit 4 includes a resonant micromechanical scanning device and a galvanometer mirror. The resonant micromechanical scanning device comprises a rectangular mirror having a diameter of 1000 μm, and the galvanometer mirror comprises a rectangular mirror having a diameter of 1200 μm.

It is assumed that an image displayed on screen 10 has a definition format defined by a horizontal array of 1280 pixels and a vertical array of 1024 pixels. It is also assumed that the displayed image has a size which is of 160 cm along a horizontal direction and 120 cm along a vertical direction when the image is projected over a distance of 100 cm.

Controller 5 controls various parts of the projection-type image display apparatus. Specifically, controller 5 performs the following processing sequences:

Controller 5 receives a video signal and modulates the intensities of laser beams emitted from light sources 1a through 1c according to the video signal. Light sources 1a through 1c thus emit laser beams modulated according to the video signal, and scanning unit 4 displays an image according to the video signal on screen 10.

For example, controller 5 performs a current control modulation process for modulating currents to be supplied to light sources 1a through 1c according to the video signal, for thereby modulating the intensities of laser beams emitted from light sources 1a through 1c. If light sources 1a through 1c include respective optical modulators, then controller 5 may control the optical modulators according to the video signal to modulate the intensities of laser beams emitted from light sources 1a through 1c. Each of the optical modulators may comprise an acoustooptical device, a grating MEMS (MicroElectroMechanical Systems) modulator, a waveguide-type modulator, or an electrooptical crystal, for example. Controller 5 may modulate laser beams emitted from the light sources according to processes which are different from light source to light source.

In the present exemplary embodiment, controller 5 modulates laser beams emitted from light sources 1a, 1b according to the current control modulation process. Light source 1c includes an acoustooptical device, and controller 5 controls the acoustooptical device depending on the video signal to modulate a laser beam emitted from light source 1c.

Controller 5 also actuates scanning unit 4. For example, controller 5 actuates the resonant micromechanical scanning device of scanning unit 4 through a deflection angle of ±20 degrees at a frequency of 31 KHz, and actuates the galvanometer mirror of scanning unit 4 through a deflection angle of ±15 degrees at a frequency of 60 Hz with a sawtooth-wave signal.

Controller 5 repeatedly selects a plurality of predetermined particular polarized states according to a predetermined sequence. Controller 5 should desirably select a particular polarized state for each frame of the video signal based on a synchronizing signal of the video signal. It is also desirable that controller 5 should alternately select two particular polarized states. The phase difference of mutually perpendicular polarized components of one of the laser beams in the two particular polarized states desirably be 180° different from the phase difference of mutually perpendicular polarized components of the other laser beam. Furthermore, the two particular polarized states should desirably be a right-handed circularly polarized state and a left-handed circularly polarized state, respectively.

Each time controller 5 selects a particular polarized state, controller 5 switches the polarized states changed by polarized state modulators 2a through 2c to the selected particular polarized state.

Switching of polarized states will be described in detail below.

Figure 3:
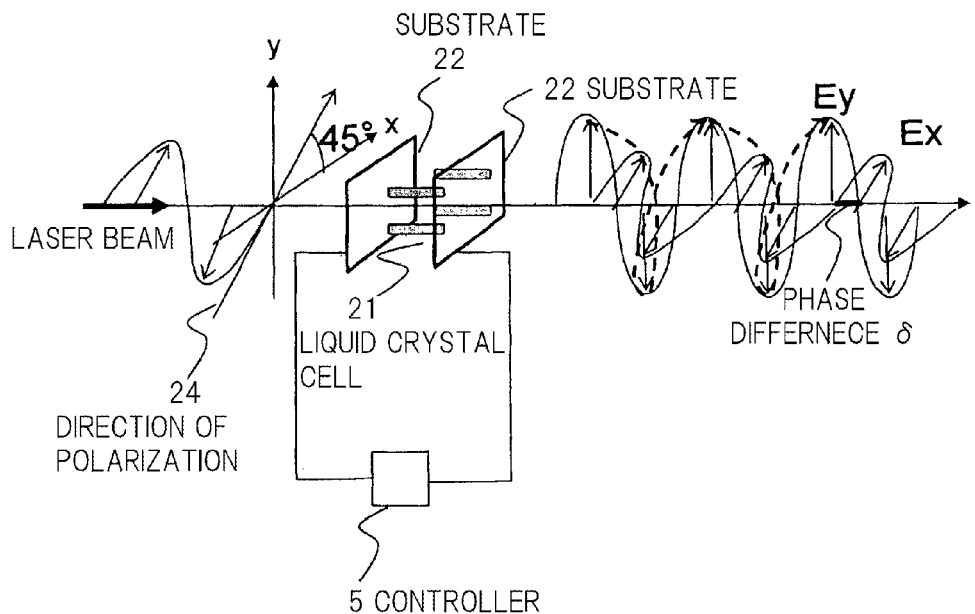
FIG. 3 is a diagram illustrating in detail a process of switching between particular polarized states.

FIG. 3 is a diagram illustrating in detail a process of switching between polarized states. Since polarized state modulators 2a through 2c are identical in arrangement to each other, polarized state modulator 2a will be described by way of example below. It is assumed that the laser beams emitted from light sources 1a through 1c are in a linearly polarized state.

In FIG. 3, polarized state modulator 2a comprises liquid crystal cell 21 in an ECB (Electrically controlled Birefringence) mode. It is assumed that liquid crystal cell 21 has a homogeneous orientation wherein the liquid crystal molecules have longer axes extending substantially parallel to substrates 22 of liquid crystal cell 21 when no AC voltage is applied thereto.

When an AC voltage is applied to liquid crystal cell 21, its birefringence Δn changes depending on the amplitude of the AC voltage. If the extraordinary refractive index, which is the refractive index of liquid crystal cell 21 in a slow-axis direction (the x direction in FIG. 3), is denoted by ne, and the ordinary refractive index, which is the refractive index of liquid crystal cell 21 in a fast-axis direction (the y direction in FIG. 3), by no, then birefringence Δn is expressed as Δn=ne−no.

Figure 4:
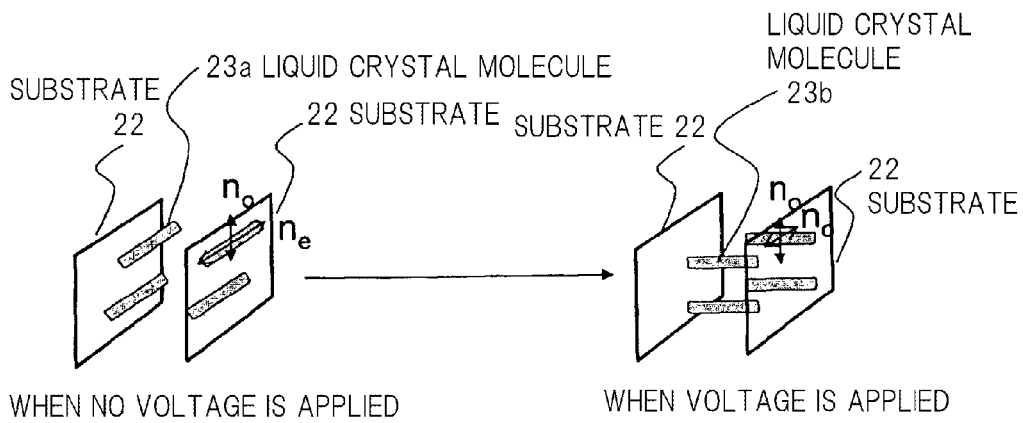
FIG. 4 is a diagram illustrating in detail the characteristics of a liquid crystal cell.

FIG. 4 is a diagram illustrating in detail the characteristics of liquid crystal cell 21. FIG. 4 shows an orientation of liquid crystal molecules 23a in liquid crystal cell 21 when no voltage is applied thereto and an orientation of liquid crystal molecules 23b in liquid crystal cell 21 when an AC voltage is applied thereto. Liquid crystal molecules 23a have their longer axes which are substantially parallel to substrates 22. Liquid crystal molecules 23b have their longer axes which are not parallel to substrates 22.

As shown in FIG. 4, when an AC voltage is applied to liquid crystal cell 21, the orientation of the liquid crystal molecules in liquid crystal cell 21 changes. Therefore, the extraordinary refractive index of liquid crystal cell 21 changes, changing birefringence Δn of liquid crystal cell 21.

Referring back to FIG. 3, the polarized component in the slow-axis direction of the laser beam that is applied to liquid crystal cell 21 passes through liquid crystal cell 21 at a speed depending on the extraordinary refractive index, and the polarized component in the fast-axis direction of the laser beam passes through liquid crystal cell 21 at a speed depending on the ordinary refractive index. Consequently, if the extraordinary refractive index and the ordinary refractive index are different from each other, a phase difference is developed between the polarized components of the laser beam, changing the polarized state of the laser beam.

As described above, since the extraordinary refractive index changes depending on the amplitude of the AC voltage applied to liquid crystal cell 21, controller 5 can switch between the polarized states of the laser beam that are changed by liquid crystal cell 21 by changing the amplitude of the AC voltage applied to liquid crystal cell 21.

Figure 5:
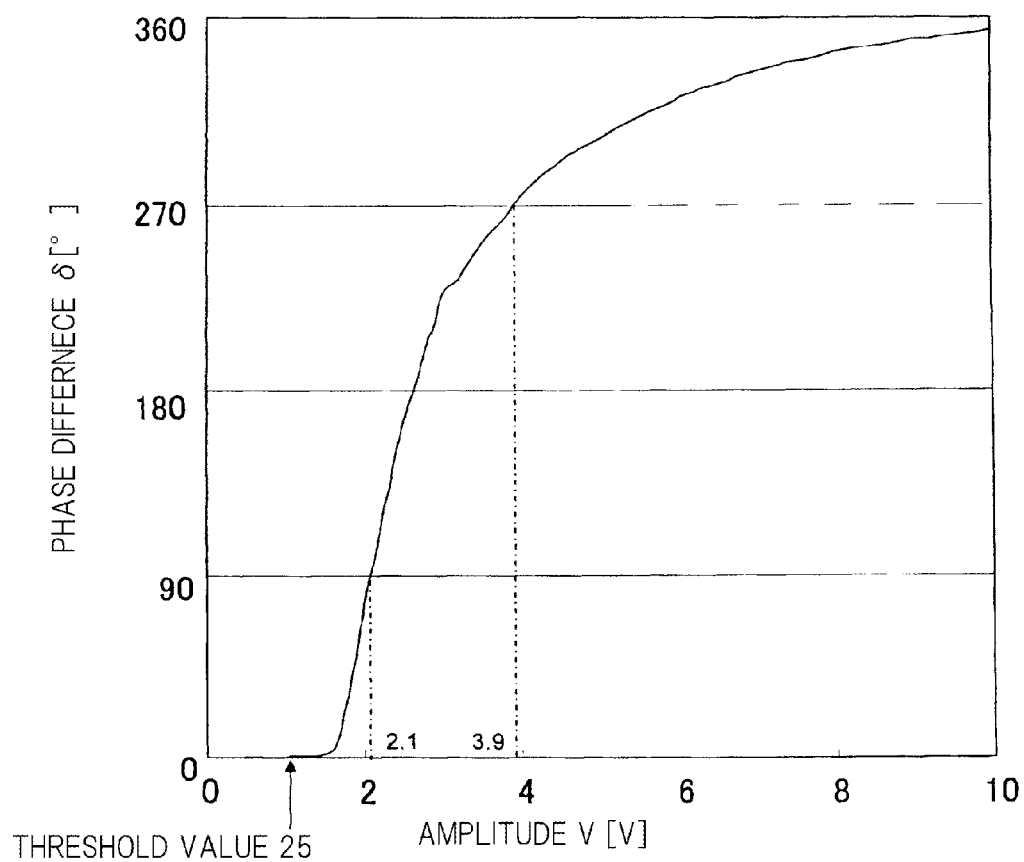
FIG. 5 is a diagram showing an example of the relationship between the amplitude of an AC voltage and the phase difference of polarized components.
Figure 6:
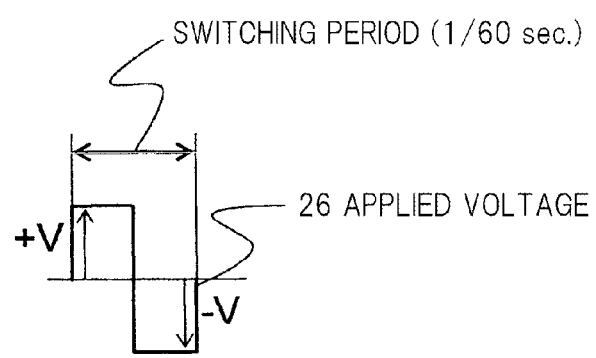
FIG. 6 is a diagram showing an example of an AC voltage.

FIG. 5 is a diagram showing an example of the relationship between amplitude V of an AC voltage and phase difference δ of polarized components. In FIG. 5, the horizontal axis represents amplitude V [V] of an AC voltage and the vertical axis phase difference δ [°] of polarized components. As shown in FIG. 6, controller 6 applies, to liquid crystal cell 21, AC voltage 26 whose cyclic period corresponds to a polarization switching period for switching between polarized states. In FIG. 6, the polarization switching period is 1/60 second which is equal to one frame period of the video signal.

The relationship between amplitude V and phase difference δ as shown in FIG. 5 varies depending on the angle at which the laser beam is applied to liquid crystal cell 21. FIG. 5 shows the relationship between amplitude V and phase difference δ at the time the laser beam is applied perpendicularly to liquid crystal cell 21.

As shown in FIG. 5, if amplitude V [V] of the AC voltage is smaller than threshold value 25, then phase difference δ remains unchanged from initial value "0". Therefore, to switch between the polarized states, controller 5 is required to apply an AC voltage whose amplitude is greater than threshold value 25 to liquid crystal cell 21.

If the particular polarized states are a right-handed circularly polarized state and a left-handed circularly polarized state, then in order to set phase difference δ [°] of polarized components to 90° and 270° (−90°), controller 5 alternately applies a rectangular wave having an amplitude of 2.1 V and a rectangular wave having an amplitude of 3.9 V to liquid crystal cell 21. Liquid crystal cell 21 is disposed on the optical path of the laser beam such that the laser beam is applied perpendicularly to liquid crystal cell 21.

If a particular polarized state is a right-handed circularly polarized state or a left-handed circularly polarized state, then since there is a need to equalize the amplitudes of the polarized components, liquid crystal cell 21 is disposed such that direction 24 of polarization of the laser beam and the slow-axis direction (the x direction) of liquid crystal cell 21 form a 45° angle therebetween.

A speckle contrast which is representative of the intensity of speckle noise is then evaluated. Specifically, the speckle contrast is of a value produced by dividing the standard deviation of the spatial intensity distribution of light by the average value of the intensity distribution, and is greater as the speckle noise is stronger.

Figure 7:
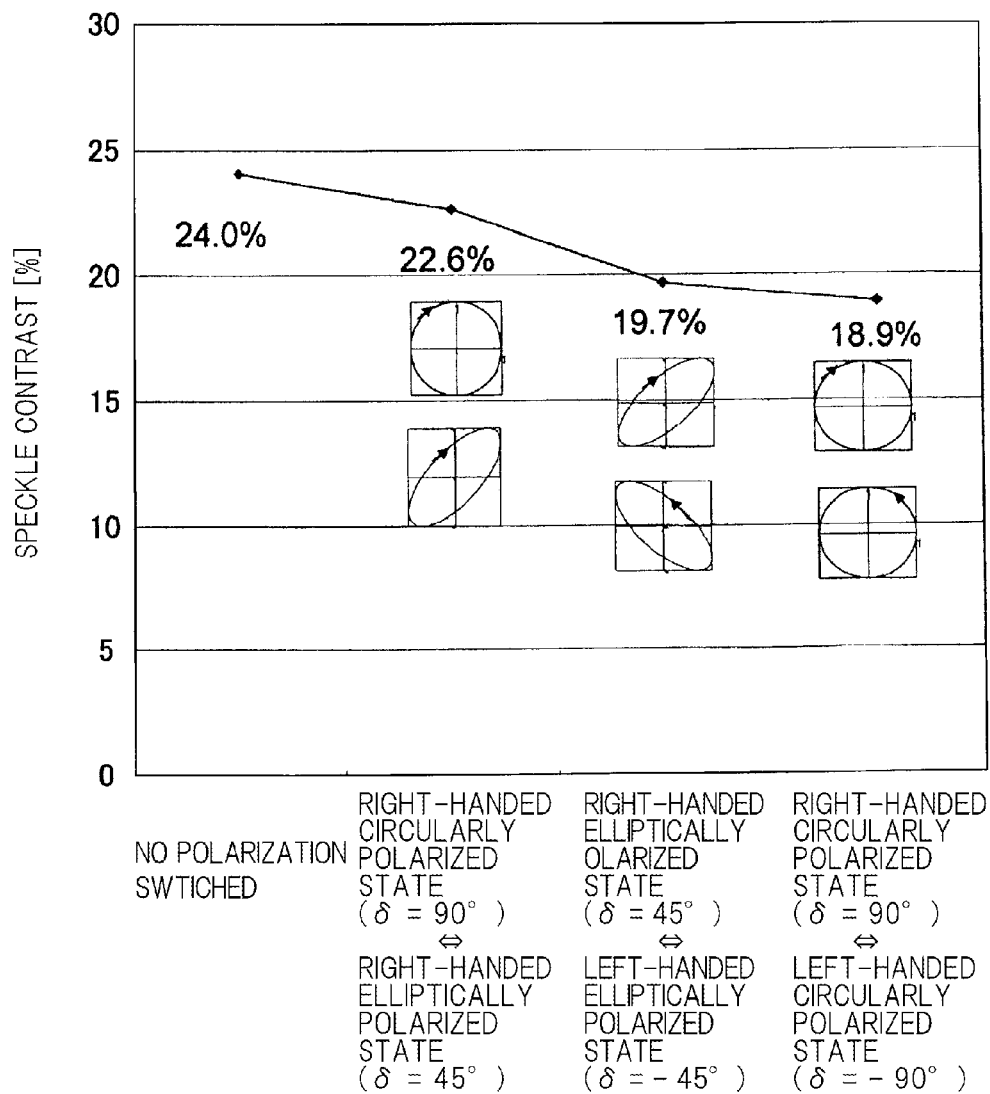
FIG. 7 is a diagram showing the relationship between speckle contrasts and particular polarized states.

FIG. 7 is a diagram showing the relationship between speckle contrasts and particular polarized states. FIG. 7 shows speckle contrasts [%] for no switching between the polarized states: particular polarized states which are a right-handed circularly polarized state (δ=90°) and a left-handed elliptically polarized state (δ=45°), particular polarized states which are a right-handed elliptically polarized state (δ=45°) and a left-handed elliptically polarized state (δ=−45°), and particular polarized states which are a right-handed circularly polarized state (δ=90°) and a left-handed circularly polarized state (δ=−90°). The polarization switching period is 1/60 second which is equal to one frame period of the video signal.

As shown in FIG. 7, the speckle contrast is 24.0% for no switching between the polarized states. If there is switching between the polarized states, then speckle contrast is lower than 24.0% regardless of the particular polarized states.

In particular, the speckle contrast is lowest when the particular polarized states are a right-handed circularly polarized state and a left-handed circularly polarized state. At this time, the speckle contrast is 18.9%.

The average value of intensity distribution IR of the right-handed circularly polarized beam and intensity distribution IL of the left-handed circularly polarized beam is expressed by the following equation 5:

$$(IR + IL)/2 = Ax^2 + Ay^2 + Ax \cdot Ay \cdot \{\cos(\phi - 90°) + \cos(\phi + 90°)\} \quad \text{[Equation 5]}$$
$$= Ax^2 + Ay^2$$

As indicated by equation 5, when the particular polarized states are a right-handed circularly polarized state and a left-handed circularly polarized state, since the interference term which causes speckles is canceled, the reduction ratio of speckles becomes greatest.

It is known that when a high-frequency current is added to a current depending on the video signal that is supplied to light sources 1a, 1b, the wavelength range of the semiconductor lasers as light sources 1a, 1b increases, reducing speckles caused by the red laser beam and the blue laser beam that are emitted from light sources 1a, 1b.

When the particular polarized states were a right-handed circularly polarized state and a left-handed circularly polarized state, and current having a frequency of 300 MHz was added as a high-frequency current, the speckles caused by the red laser beam and the blue laser beam that are emitted from light sources 1a, 1b were reduced to 12%.

Since an action to eliminate polarization by screen 10 is greater, i.e., since screen 10 is closer to a totally diffusive surface, it is more effective to reduce speckles. When screen 10 is essentially to a totally diffusive surface and the particular polarized states are a right-handed circularly polarized state and a left-handed circularly polarized state, the speckle contrast is reduced to 2%.

For evaluating the speckle contrast, the following apparatus components were used:

Liquid crystal cell 21, which served as polarized state modulators 2a through 2c, employed a nematic liquid crystal having ordinary refractive index no=1.5, extraordinary refractive index ne=1.7, and birefringence Δn=ne−no=0.2 for a laser beam having a wavelength of 532 nm. These values of ordinary refractive index no, extraordinary refractive index ne, and birefringence Δn were values when no voltage was applied. Liquid crystal cell 21 had a cell gap of 5 μm.

Controller 5 controlled the timing of emission and the intensity of the laser beams from light sources 1a through 1c at intervals of 2 ns which is 1/6 of or smaller than the period of a pixel clock (12.7 ns), in synchronism with the operation of the resonant micromechanical scanning device and the galvanometer mirror of scanning unit 4. The polarization switching period was 1/60 second.

The intensity distribution of the beam was measured by an evaluation system including a CMOS sensor (pixel pitch: 2.2 μm) combined with a lens having a focal length of 18 mm and a pupil diameter of 2.25 mm, simulative of a human eye, and the speckle contrast was evaluated based on the measured intensity distribution.

When the particular polarized states were a right-handed circularly polarized state and a left-handed circularly polarized state, controller 5 applied AC voltages having amplitudes of 2.6 V and 5.6 V to polarized state modulator 2a, applied AC voltages having amplitudes of 1.8 V and 4.0 V to polarized state modulator 2b, and applied AC voltages having amplitudes of 2.2 V and 4.8 V to polarized state modulator 2c.

Advantages will be described below.

According to the present exemplary embodiment, light sources 1a through 1c emit laser beams modulated by the video signal. Scanning unit 4 projects the laser beams emitted from light sources 1a through 1c. Polarized state modulators 2a through 2c change the polarized state of the laser beams emitted from light sources 1a through 1c to scanning unit 4. Controller 5 repeatedly selects a plurality of predetermined particular polarized states according to a predetermined sequence. Controller 5 switches the polarized state changed by polarized state modulators 2a through 2c to the selected particular polarized states.

The polarized state of the laser beams emitted from light sources 1a through 1c is switched to the predetermined particular polarized states according to the predetermined sequence. Therefore, the interference term corresponding to a laser beam in a certain particular polarized state can be suppressed using the interference term corresponding to a laser beam in another certain particular polarized state, making it possible to increase the reduction ratio of speckles.

According to the present exemplary embodiment, there are two particular polarized states, and controller 5 alternately selects the two particular polarized states.

Therefore, since the interference term corresponding to a laser beam in one of the particular polarized state can be suppressed using the interference term corresponding to the other particular polarized state, it is possible to quickly suppress the intermediate term and hence to further increase the reduction ratio of speckles.

According to the present exemplary embodiment, furthermore, the phase difference between mutually perpendicular polarized components of the laser beam in one of the two particular polarized states and the phase difference between mutually perpendicular polarized components of the laser beam in the other particular polarized state are different from each other by 180°.

Therefore, since the interference term corresponding to the laser beam in one of the particular polarized states can be efficiently suppressed using the interference term corresponding to the other particular polarized state, it is possible to further increase the reduction ratio of speckles.

According to the present exemplary embodiment, furthermore, the particular polarized states include a right-handed circularly polarized state and a left-handed circularly polarized state. Therefore, inasmuch as the interference term corresponding to the laser beam in one of the particular polarized states can be suppressed using the interference term corresponding to the other particular polarized state, it is possible to further increase the reduction ratio of speckles.

According to the present exemplary embodiment, moreover, a particular polarized state is selected for each frame of the video signal. Therefore, since it is possible to change the particular polarized state of a laser beam that is applied to the same position on screen 10, it becomes possible to further increase the reduction ratio of speckles.

According to the present exemplary embodiment, each of polarized state modulators 2a through 2c is associated with one of light sources 1a through 1c, and change the polarized state of a laser beam emitted from the associated light source. Therefore, the polarized states of the laser beams emitted from light sources 1a through 1c can appropriately be switched to further increase the reduction ratio of speckles.

According to the present exemplary embodiment, laser beams are used as light beams emitted from light sources 1a through 1c, and scanning unit 4 for projecting the laser beams and for scanning the screen with the laser beams is used as the projecting means.

When laser beams are projected onto the screen and the screen is scanned with the projected laser beams, strong speckles are produced. Since the reduction ratio of speckles can be lowered, the speckles can be greatly reduced.

A second exemplary embodiment will be described below.

Figure 8:
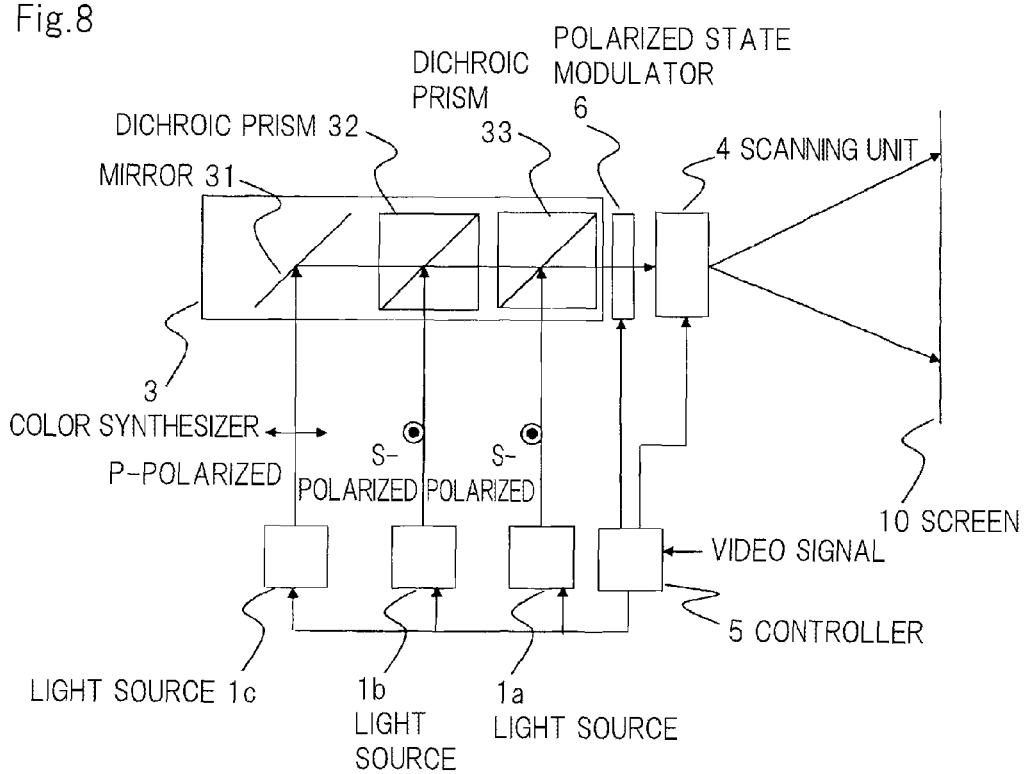
FIG. 8 is a block diagram showing the arrangement of a projection-type image display apparatus according to a second exemplary embodiment of the present invention.

FIG. 8 is a block diagram showing the arrangement of a projection-type image display apparatus according to the present exemplary embodiment. As shown in FIG. 8, the projection-type image display apparatus includes light sources 1a through 1c, color synthesizer 3, scanning unit 4, controller 5, and polarized state modulator 6.

It is assumed that laser beams emitted from light sources 1a, 1b are polarized perpendicularly to the sheet of FIG. 8, and are S-polarized with respect to the respective reflecting surfaces of dichroic prisms 32, 33. It is also assumed that a laser beam emitted from light source 1c is polarized parallel to the sheet of FIG. 8, and is P-polarized with respect to the reflecting surface of mirror 31. The reflecting surfaces of dichroic prisms 32, 33 and the reflecting surface of mirror 31 lie parallel to each other.

Color synthesizer 3 includes mirror 31 and dichroic prisms 32, 33.

Mirror 31 reflects a green laser beam emitted from light source 1c. It is assumed that the reflected laser beam remains to be P-polarized.

Dichroic prism 32 transmits the green laser beam reflected by mirror 31, and reflects the red laser beam emitted from light source 1b.

Figure 9:
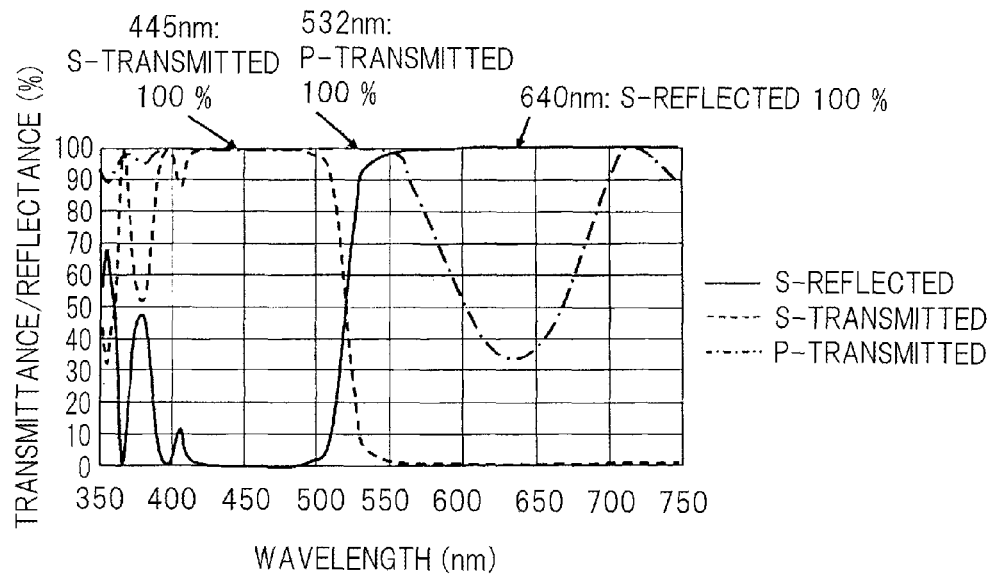
FIG. 9 is a diagram showing an example of the relationship between the reflectance and transmittance of a dichroic prism and wavelengths.

FIG. 9 is a diagram showing an example of the relationship between the reflectance and transmittance of dichroic prism 32 and wavelengths. In FIG. 9, the horizontal axis represents wavelengths of the laser beams and the vertical axis the reflectance or transmittance (%). FIG. 9 shows the transmittance of the S-polarized laser beam (S-transmitted), the transmittance of the P-polarized laser beam (P-transmitted), and the reflectance of the S-polarized laser beam (S-reflected). The transmittance of the S-polarized laser beam is 100% when it has a wavelength of 445 nm, the transmittance of the P-polarized laser beam is 100% when it has a wavelength of 532 nm, and the reflectance of the S-polarized laser beam is 100% when it has a wavelength of 640 nm.

As shown in FIG. 9, dichroic prism 32 can transmit 99% or more of the P-polarized green laser beam (wavelength: 532 nm) and can reflect 99% or more of the S-polarized red laser beam (wavelength: 640 nm).

Referring back to FIG. 8, dichroic prism 33 transmits the green laser beam which has been transmitted through dichroic prism 32 and the red laser beam which has been reflected by dichroic prism 32, and reflects the blue laser beam emitted from light source 1a.

Figure 10:
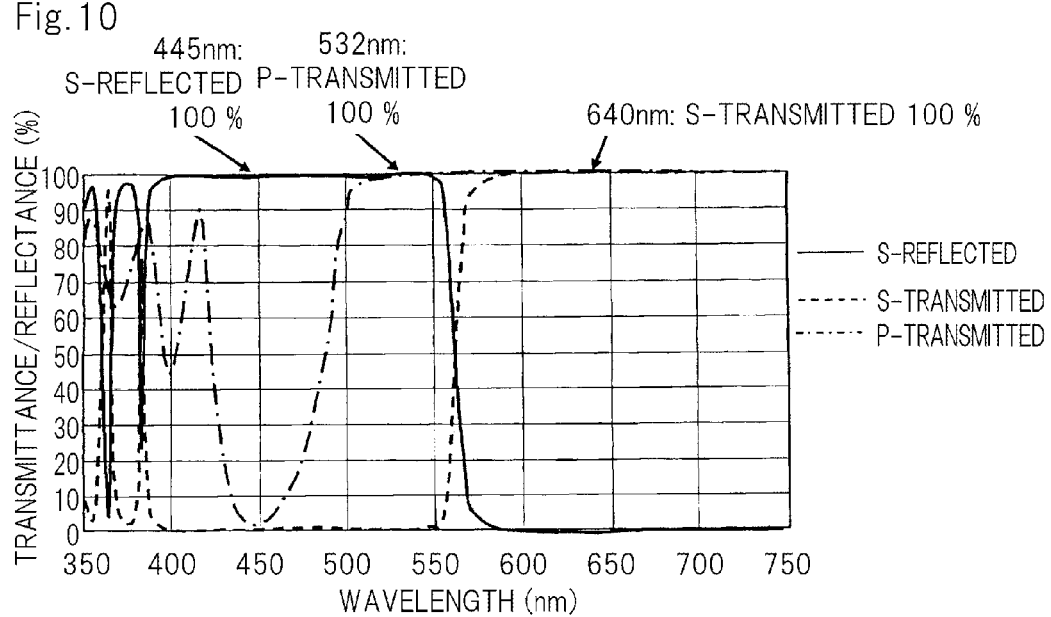
FIG. 10 is a diagram showing an example of the relationship between the reflectance and transmittance of another dichroic prism and wavelengths.

FIG. 10 is a diagram showing a example of the relationship between the reflectance and transmittance of dichroic prism 33 and wavelengths. In FIG. 10, the horizontal axis represents wavelengths of the laser beams and the vertical axis represents reflectance or transmittance (%). FIG. 10 shows the transmittance of the S-polarized laser beam, the transmittance of the P-polarized laser beam, and the reflectance of the S-polarized laser beam. The reflectance of the S-polarized laser beam is 100% when it has a wavelength of 445 nm, the transmittance of the P-polarized laser beam is 100% when it has a wavelength of 532 nm, and the transmittance of the S-polarized laser beam is 100% when it has a wavelength of 640 nm.

As shown in FIG. 10, dichroic prism 32 can transmit 99% or more of the P-polarized green laser beam (wavelength: 532 nm) and the S-polarized red laser beam (wavelength: 640 nm), and can reflect 99% or more of the S-polarized blue laser beam (wavelength: 440 nm).

Mirror 31 and dichroic prisms 32, 33 are disposed to guide the laser beams along one optical axis for synthesizing the laser beams emitted from light sources 1a through 1c into a synthesized laser beam on the same optical axis.

Light source 1a and dichroic prism 33 and light source 1b and dichroic prism 32 may be positionally switched around.

Referring back to FIG. 8, polarized state modulator 6 is an example of changing means. Polarized state modulator 6 changes the polarized state of the synthesized laser beam generated by color synthesizer 3.

It is assumed that polarized state modulator 6 comprises a liquid crystal cell in an ECB mode, as with polarized state modulators 6a through 6c according to the first exemplary embodiment.

Figure 11:
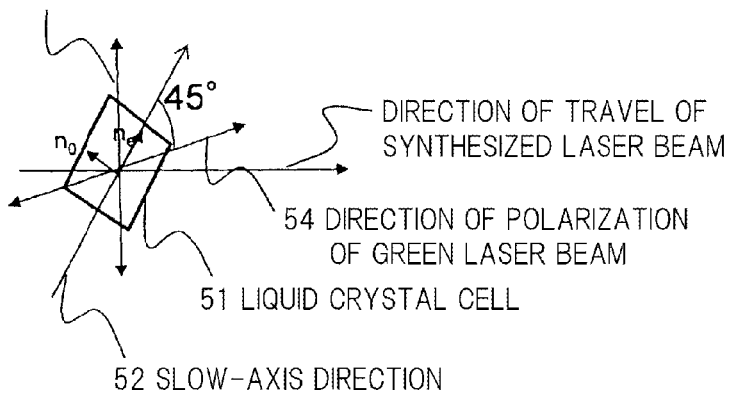
FIG. 11 is a diagram showing an example of the layout of a liquid crystal cell in an ECB mode.

FIG. 11 is a diagram showing an example of the layout of a liquid crystal cell in an ECB mode. FIG. 11 shows the an example of the layout of a liquid crystal cell in an ECB mode in the case where the particular polarized states are a right-handed circularly polarized state and a left-handed circularly polarized state.

As shown in FIG. 11, slow-axis direction 52 of liquid crystal cell 51 in the ECB mode and direction 52 of polarization of the red laser beam and the blue laser beam which are included in the synthesized laser beam form 45° therebetween, and slow-axis direction 52 and direction 54 of polarization of the green laser beam form 45° therebetween.

Figure 12:
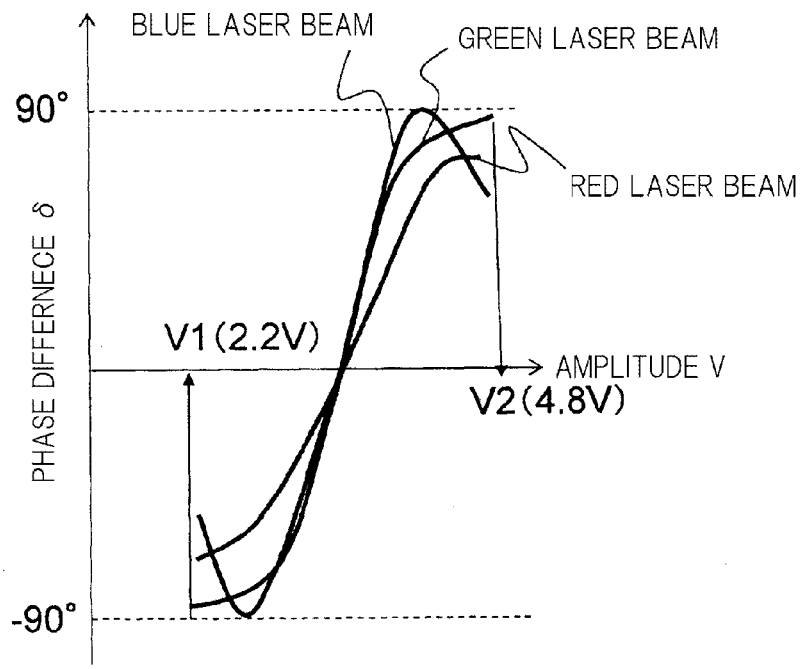
FIG. 12 is a diagram showing an example of the relationship between the amplitude of an AC voltage and the phase difference of polarized components.

FIG. 12 is a diagram showing an example of the relationship between amplitude V of an AC voltage applied to liquid crystal cell 51 and phase difference δ of polarized components of the laser beams included in the synthesized laser beam. In FIG. 12, the horizontal axis represents amplitude V of an AC voltage applied to liquid crystal cell 51 and the vertical axis represents phase difference δ of polarized components of the laser beams.

As shown in FIG. 12, the relationship between amplitude V and phase difference 6 changes depending on the colors (wavelengths) of the laser beams. Consequently, even if amplitude V is adjusted, it is difficult to switch phase difference δ of polarized components of all the laser beams included in the synthesized laser beam between 90° and −90°, and also to switch all the laser beams between a right-handed circularly polarized state and a left-handed circularly polarized state.

According to the present exemplary embodiment, the green laser beam is switched between a right-handed circularly polarized state and a left-handed circularly polarized state. Specifically, controller 5 alternately applies an AC voltage having an amplitude of V1 (2.2 V) and an AC voltage having an amplitude of V2 (4.8 V) to liquid crystal cell 51 so that phase difference 6 of polarized components of the green laser beam becomes 90° and −90°.

speckles in green light can be most strongly sensed by human beings, therefore, these speckles are the ones that most reduced among others in order to effectively reduce the speckles that are sensed by the human beings. As described above, the speckles due to the red laser beam and the green laser beam can be reduced by adding a high-frequency current to a current depending on the video signal that is supplied to light sources 1a, 1b. Therefore, the speckles caused by laser beams in all the colors can be efficiently reduced by reducing, most intensively among others, the speckles due to the green laser beam which cannot easily be reduced by the added high-frequency current.

Scanning unit 4 projects the laser beam whose polarized state has been changed by polarized state modulator 6 and scans the screen two-dimensionally with the projected laser beam.

Advantages will be described below.

According to the present exemplary embodiment, color synthesizer 3 synthesizes the laser beams emitted respectively from light sources 1a through 1c. Polarized state modulator 6 changes the polarized state of the synthesized laser beam generated by color synthesizer 3. Even though there are a plurality of light sources, there is only one polarized state modulator 6, making it possible to simplify the arrangement of the projection-type image display apparatus.

A third exemplary embodiment will be described below.

Figure 13:
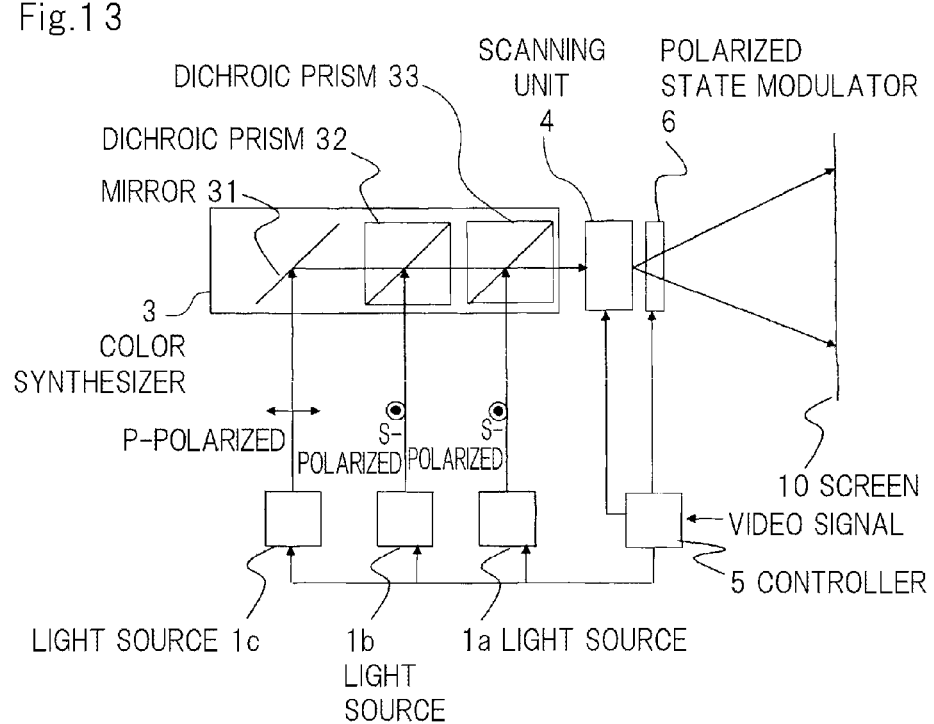
FIG. 13 is a block diagram showing the arrangement of a projection-type image display apparatus according to a third exemplary embodiment of the present invention.

FIG. 13 is a block diagram showing the arrangement of a projection-type image display apparatus according to a third exemplary embodiment of the present invention. The projection-type image display apparatus shown in FIG. 13 is different from the projection-type image display apparatus shown in FIG. 12 in that polarized state modulator 6 is in a stage subsequent to scanning unit 4.

Scanning unit 4 projects the laser beam synthesized by color synthesizer 3 and scans the screen two-dimensionally with the projected laser beam.

Polarized state modulator 6 changes the polarized state of the laser beam projected by scanning unit 4.

If polarized state modulator 6 comprises a liquid crystal cell in an ECB mode as shown in FIG. 11, then it is necessary that the laser beams included in the synthesized laser beam with which the screen is scanned by scanning unit 4 be linearly polarized. Therefore, scanning unit 4 needs to scan the screen two-dimensionally with the synthesized laser beam while keeping the laser beams of the synthesized laser beam linearly polarized.

Figure 14:
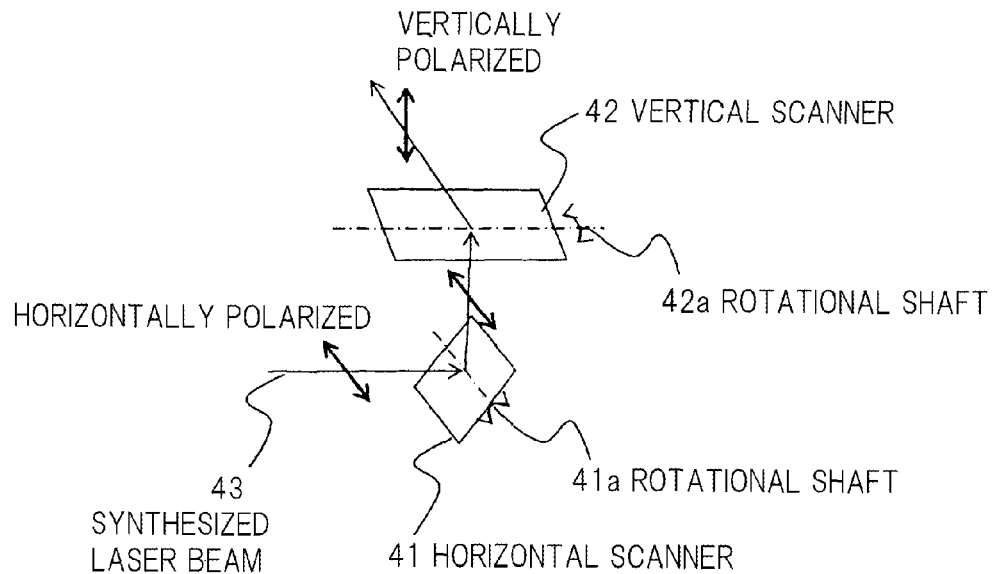
FIG. 14 is a diagram showing the arrangement of a scanning unit.

FIG. 14 is a diagram showing the arrangement of scanning unit 4 which is capable of deflecting the synthesized laser beam while keeping the laser beams of the synthesized laser beam linearly polarized. As shown in FIG. 14, scanning unit 4 includes horizontal scanner 41 and vertical scanner 42.

Horizontal scanner 41 comprises a scanning mirror for horizontally deflecting synthesized laser beam 43 applied to scanning unit 4, and vertical scanner 42 comprises a scanning device for vertically deflecting the synthesized laser beam deflected by horizontal scanner 41.

Horizontal scanner 41 is disposed such that its rotational shaft 41a lies parallel to the direction of polarization of the green laser beam (S-polarized with respect to the reflecting surface of horizontal scanner 41) included in synthesized laser beam 43. Vertical scanner 42 is disposed such that its rotational shaft 42a lies parallel to the direction along which synthesized laser beam 43 travels.

The direction of polarization of the green laser beam included in synthesized laser beam 43 is perpendicular to the plane of incidence of the green laser beam on horizontal scanner 41. Therefore, the direction of polarization of the green laser beam remains unchanged even when the green laser beam is deflected (reflected) by horizontal scanner 41.

The direction of polarization of the green laser beam which is deflected by horizontal scanner 41 is perpendicular to rotational shaft 42a of vertical scanner 42. When the green laser beam is reflected (deflected) by vertical scanner 42, the direction of polarization of the green laser beam changes to a vertical direction. In other words, when the green laser beam is deflected by scanning unit 4, it changes to an S-polarized laser beam with respect to the reflecting surface of vertical scanner 42.

The direction of polarization of the red laser beam and the blue laser beam (P-polarized with respect to the reflecting surface of horizontal scanner 41) included in synthesized laser beam is perpendicular to rotational axis 41*a*. When the red laser beam and the blue laser beam are reflected (deflected) by horizontal scanner 41, the direction of polarization thereof changes to a direction which is the same direction as rotational shaft 42*a* of vertical scanner 42.

The direction of polarization of the red laser beam and the blue laser beam which are deflected by horizontal scanner 41 is perpendicular to the plane of incidence of the red laser beam and the blue laser beam on vertical scanner 42. Therefore, the direction of polarization of the red laser beam and the blue laser beam remains unchanged when they are deflected by vertical scanner 42. In other words, the red laser beam changes to an S-polarized laser beam with respect to the reflecting surface of vertical scanner when deflected by scanning unit 4.

Consequently, when the laser beams included in synthesized laser beam 43 are deflected by scanning unit 4, the directions of polarization of the laser beams change, but remain linearly polarized.

Referring back to FIG. 13, polarized state modulator 6 changes the polarized state of the synthesized laser beam from scanning unit 4.

At this time, since the synthesized laser beam from scanning unit 4 is emitted in various directions, the synthesized laser beam is applied at various incident angles to polarized state modulator 6.

If polarized state modulator 6 comprises a liquid crystal cell in an ECB mode, then the laser beams included in the synthesized laser beam have their polarized states changed according to the incident angle even though the amplitude of the AC voltage applied to the liquid crystal cell remains the same. Therefore, it is desirable to compensate for the dependency of the polarized states on the incident angle by switching the polarized state of the green laser beam included in the synthesized laser beam between a right-handed circularly polarized state and a left-handed circularly polarized state.

Figure 15:
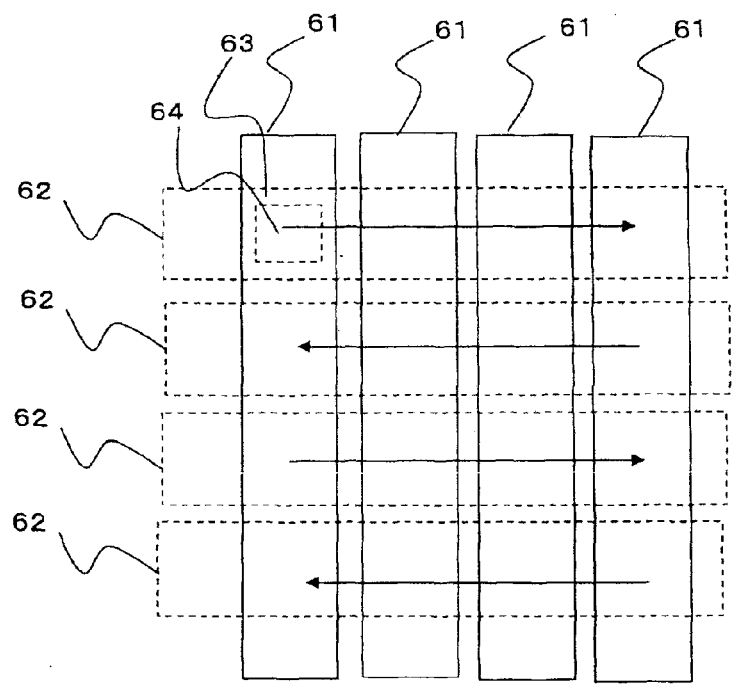
FIG. 15 is a diagram showing the arrangement of a polarized state modulator.

FIG. 15 is a diagram showing the arrangement of polarized state modulator 6 which is capable of compensating for the dependency of the polarized states on the incident angle.

As shown in FIG. 15, polarized state modulator 6 includes a plurality of linear electrodes 61 extending vertically and disposed parallel at spaced intervals and a plurality of linear electrodes 62 extending horizontally and disposed parallel at spaced intervals. Electrodes 61, 62 are disposed across each other in confronting relationship. Liquid crystal cells 64 in an ECB mode are sandwiched between crossing regions 63 of electrodes 61, 62. Liquid crystal cells 65 are thus arranged in a simple matrix.

With polarized state modulator 6 being disposed in front of scanning unit 4, the synthesized laser beam is applied at different incident angles respectively to liquid crystal cells 64 arranged in the simple matrix. Therefore, when controller 5 applies AC voltages of different amplitudes respectively to liquid crystal cells 64 to which the synthesized laser beam is applied, it is possible to compensate for the dependency of the polarized states on the incident angle.

For example, in synchronism with the operation of scanning unit 4, controller 5 energizes liquid crystal cells 64 arranged in the simple matrix according to a voltage averaging process. According to the voltage averaging process, controller 5 applies a selective voltage through electrodes 61, 62 to those liquid crystal cells 64 to which the synthesized laser beam is applied, and applies an unselective voltage through electrodes 61, 62 to other liquid crystal cells 64.

The selective voltage refers to an AC voltage having an amplitude for setting the polarized state of the green laser beam to a right-handed circularly polarized state or a left-handed circularly polarized state. The unselective voltage refers to an AC voltage having an amplitude smaller than a threshold value for keeping phase difference δ unchanged from its initial value.

The liquid crystal cells may be arranged in an active matrix. The controller may energize the liquid crystal cells according to a process other than the voltage averaging process.

Advantages will be described below.

According to the present exemplary embodiment, scanning unit 4 projects the synthesized laser beam generated by color synthesizer 3. Polarized state modulator 6 changes the polarized state of the synthesized laser beam projected by scanning unit 4. At this time, the polarized state of the projected synthesized laser beam changes. Consequently, when scanning unit 4 projects the synthesized laser beam, the polarized state of the synthesized laser is prevented from being shifted from a particular polarized state.

A fourth exemplary embodiment will be described below.

Figure 16:
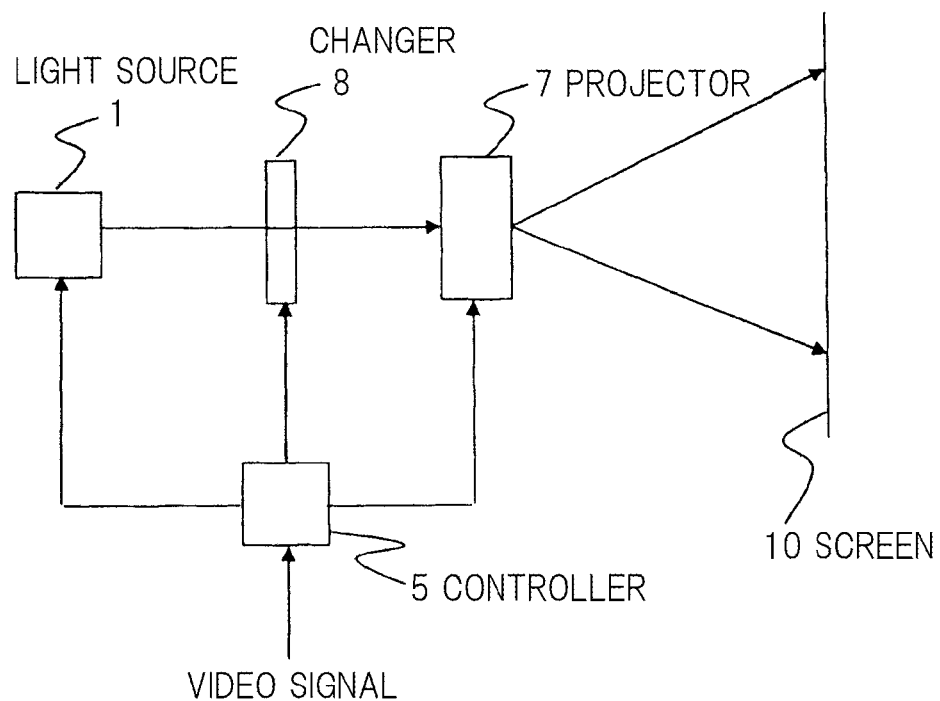
FIG. 16 is a block diagram showing the arrangement of a projection-type image display apparatus according to a fourth exemplary embodiment of the present invention.

FIG. 16 is a block diagram showing the arrangement of a projection-type image display apparatus according to a fourth exemplary embodiment of the present invention. As shown in FIG. 16, the projection-type image display apparatus includes light source 1, controller 5, projector 7, and changer 8.

Light source 1 emits a light beam.

Projector 7 projects the light beam emitted from light source 1 to display an image on screen 10. Projector 7 may comprise scanning devices such as a horizontal scanner and a vertical scanner, or a projecting device different from scanning devices, such as a DMD (Digital Micromirror Device) or a GLV (Grating Light Valve).

Changer 8, which is disposed between light source and projector 7, changes the polarized state of the light beam emitted from light source 1 to projector 7. Changer 8 may be disposed in a stage subsequent to projector 7 and may change the polarized state of the light beam projected by projector 7. Changer 8 may comprise, for example, liquid crystal cell 11 in an ECB mode shown in FIG. 3.

Controller 5 receives a video signal and modulates the light beam emitted from light source 1 depending on the received video signal. Light source 1 thus emits the light beam modulated depending on the video signal. Controller 5 may modulate the light beam according to any desired modulating processes.

Controller 5 also adjusts the direction in which the light beam is projected by projector 7, based on the video signal.

Controller 5 also repeatedly selects a plurality of particular polarized states according to a predetermined sequence. Controller 5 switches the polarized state changed by changer 8 to the selected particular polarized states.

Advantages will be described below.

According to the present exemplary embodiment, a light source emits the light beam modulated depending on the video signal. Projector 7 projects the light beam emitted from light source 1 to display an image. Changer 8 changes the polarized state of the light beam emitted from light source 1 to projector 7 or changes the polarized state of the light beam projected from projector 7. Controller 5 repeatedly selects a plurality of particular polarized states according to a predetermined sequence. Controller 5 switches the polarized state changed by changer 8 to the selected particular polarized states.

Since the polarized state of the light beam emitted from light source 1 is switched to the plural particular polarized states according to the predetermined sequence, it is possible to increase the reduction ratio of speckles.

Although the exemplary embodiments of the present invention have been described above, the present invention is not limited to the above exemplary embodiments. Various changes which can be understood by those skilled in the art within the scope of the present invention may be made to the arrangement and details of the present invention.

For example, while three light sources are employed in the first through third exemplary embodiments and one light source in the fourth exemplary embodiment, the number of light sources is actually not limited to three or one, but may be changed appropriately. The colors (wavelengths) of laser beams emitted from the light sources are not limited to blue, red, and green, but may be changed appropriately. While the light beams emitted from the light sources have been illustrated as being laser beams, they may be any coherent light beams.

Each of polarized state modulators 2a through 2c and changer 8 is not limited to liquid crystal cell 21 in an ECB mode, but may be changed appropriately. For example, each of polarized state modulators 2a through 2c and changer 8 may comprise an electrooptical device capable of changing a polarized state, made of lithium niobate (LiNbO3) or lead lanthanum zirconate titanate (PLZT), for example.

The intensity of the laser beams emitted from light sources 1, 1a through 1c may be modulated by controller 5 according to a pulse width modulation process. According to the pulse width modulation process, light sources 1, 1a through 1c are supplied with pulse currents each having duration less than a time for scanning one pixel, and the duty ratio of the pulse currents is changed.

The definition format of the displayed image is illustrated by being defined by a horizontal array of 1280 pixels and a vertical array of 1024 pixels. Actually, however, the definition format is not limited to these values, but may be changed appropriately.

The horizontal scanner and the vertical scanner of scanning unit 4 may be changed appropriately in configuration insofar as they have a size greater than the diameter of laser beams 1a through 1c.

This application is based upon and claims the benefit of priority from Japanese Patent Application No. 2009-94775 filed on Apr. 9, 2009, the entire disclosure of which is incorporated herein by reference.

What is claimed is:

1. A method of controlling a projection-type image display apparatus including a light source for emitting a light beam modulated according to a video signal, a projector that projects the light beam emitted from said light source to display an image, and a changer that changes a polarized state of the light beam emitted from said light source to said projector or that changes a polarized state of the light beam projected by said projector by applying a voltage to a polarized state module comprising a material that changes polarization in response to the applied voltage, said method comprising:
repeatedly selecting a plurality of predetermined particular polarized states according to a predetermined sequence; and
switching the polarized state changed by said changer to the selected particular polarized states,
wherein:
the light beam incident on the projector during a first frame period has a first polarization state at the surface at which the beam intercepts the projector; and
the light beam incident on the projector during a second frame period which follows the first frame period has a second polarization state, different from the first polarization state, at the surface at which the beam intercepts the projector.

2. A projection-type image display apparatus comprising:
a light source for emitting a light beam that is modulated according to a video signal;
a projector that projects the light beam emitted from said light source to display an image;
a changer that changes a polarized state of the light beam emitted from said light source to said projector or that changes a polarized state of the light beam projected by said projector; and
a controller that repeatedly selects a plurality of predetermined particular polarized states according to a predetermined sequence, and switches the polarized state changed by said changer to the selected particular polarized states, wherein:
the light beam incident on the projector during a first frame period has a first polarization state at the surface at which the beam intercepts the projector; and
the light beam incident on the projector during a second frame period which follows the first frame period has a second polarization state, different from the first polarization state, at the surface at which the beam intercepts the projector.

3. The projection-type image display apparatus of claim 2, wherein the changer is configured to change the polarized state of the light beam by applying a voltage to a polarized state module comprising a material that changes polarization in response to the applied voltage.

4. The projection-type image display apparatus according to claim 2, wherein the particular polarized states include at least an elliptically polarized state or a circularly polarized state.

5. The projection-type image display apparatus according to claim 2, wherein the particular polarized states include two particular polarized states; and
said controller alternately repeatedly selects said two particular polarized states.

6. The projection-type image display apparatus according to claim 5, wherein the phase difference between mutually perpendicular polarized components of a light beam in one of the particular polarized states and the phase difference between mutually perpendicular polarized components of a light beam in the other particular polarized state are different from each other by 180°.

7. The projection-type image display apparatus according to claim 6, wherein the particular polarized states are a right-handed circularly polarized state and a left-handed circularly polarized state.

8. The projection-type image display apparatus according to claim 2, wherein said controller selects a particular polarized state for each frame of the video signal.

9. The projection-type image display apparatus according to claim 2, wherein said light source comprises a plurality of light sources; and
said changer comprises a plurality of changers, each associated with one of said light sources for changing the polarized state of the light beam emitted from the associated light source to said projector.

10. The projection-type image display apparatus according to claim 2, wherein said light source comprises a plurality of light sources, said projection-type image display apparatus further comprising:
    a synthesizer that synthesizes light beams emitted respectively from said light sources to said projector;
    wherein said changer changes the polarized state of a synthesized light beam from said synthesizer; and
    said projector projects the light beam whose polarized state is changed by said changer.

11. The projection-type image display apparatus according to claim 2, wherein said light source comprises a plurality of light sources, said projection-type image display apparatus further comprising:
    a synthesizer that synthesizes light beams emitted respectively from said light sources to said projector;
    wherein said projector projects a synthesized light beam from said synthesizer; and
    said changer changes the polarized state of the light beam projected by said projector.

12. The projection-type image display apparatus of claim 2, wherein:
    the light source emits at least one laser beam; and
    images are formed on the projector by scanning at least one laser beam the projector surface.

13. The projection-type image display apparatus of claim 12, wherein:
    the laser beam scans through a plurality of pixels on the projector during a frame;
    during displaying of a frame a beam intensity and a direction of the beam is changed according to the video signal such as to form an image.

14. The projection-type image display apparatus of claim 2, wherein the projector surface is a diffusive surface.

\* \* \* \* \*